(12) United States Patent
Marni (10) Patent No.: US 6,285,410 B1
(45) Date of Patent: Sep. 4, 2001

(54) METHOD AND SYSTEM FOR REMOVAL OF FLASH ARTIFACTS FROM DIGITAL IMAGES

(75) Inventor: Sandrine Marni, Gattieres (FR)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 09/151,793

(22) Filed: Sep. 11, 1998

(51) Int. Cl.[7] ................................................ H04N 9/64
(52) U.S. Cl. ........................... 348/576; 348/577; 348/370
(58) Field of Search ................................... 348/370, 371, 348/576, 577, 222; 382/117, 162, 224, 225, 260, 118; 396/158

(56) References Cited

U.S. PATENT DOCUMENTS

| | | | |
|---|---|---|---|
| 4,978,989 | * 12/1990 | Nakano et al. | 396/177 |
| 5,130,789 | * 7/1992 | Dobbs et al. | 358/500 |
| 5,748,764 | * 5/1998 | Benati et al. | 382/117 |
| 5,990,973 | * 11/1999 | Sakamoto | 382/117 |
| 6,009,209 | * 12/1999 | Acker et al. | 382/275 |
| 6,016,354 | * 1/2000 | Lin et al. | 382/117 |
| 6,072,893 | * 6/2000 | Luo et al. | 382/117 |
| 6,085,195 | * 7/2000 | Hoyt et al. | 396/2 |
| 6,151,403 | * 11/2000 | Luo | 347/117 |

OTHER PUBLICATIONS

Adobe Systems Incorporated, "CustomerFirst Support PhotoDeluxe 2.0 New Features", 1998, Downloaded from URL: http://www.adobe.com/supportservice/custsupport/NOTES/610a.htm.

James D. Foley, Andries van Dam, Steven K. Feiner, and John F. Hughes, "Computer Graphics: Principles and Practice", Addison–Wesley Publishing Company, Inc., 1990, pp. 563–604, ISBN 0–201–12110–7.

Robert V. Hogg and Elliot A. Tanis, "Probability and Statistical Inference", Macmillan Publishing Co., Inc., 1997, pp. 201–239, ISBN 0–02–355650–1.

Microsoft Corporation, "PictureIt! Product Info Fact Sheet", 1997, Downloaded from URL: http://www.microsoft.com/pictureit/fact.htm.

Microsoft Corporation, "PictureIt! Express What's New", 1998, Downloaded from URL: http://www.microsoft.com/pictureit/express.whatnew.htm.

Adobe Systems Incorporated, "Adobe PhotoDeluxe Home Edition 3.0: Easily Repair and Enhance Photos", 1998, Downloaded from URL: http://www.adobe.com/prodindex/photodeluxe/repair.htm.

* cited by examiner

Primary Examiner—Wendy R. Garber
Assistant Examiner—Mitchell White
(74) Attorney, Agent, or Firm—Blakely, Sokoloff, Taylor & Zafman (57) ABSTRACT

A method and system for removal of flash artifacts from a digital image containing pixels therein, including using a database of reference flash-corrupted images for identifying corrupted pixels within the digital image that have been corrupted by a flash, and modifying the color values of each corrupted pixel of the digital image, to correct the corrupted pixel color values.

48 Claims, 5 Drawing Sheets

METHOD AND SYSTEM FOR REMOVAL OF FLASH ARTIFACTS FROM DIGITAL IMAGES

FIELD OF THE INVENTION

The present invention relates to removal of red-eye and other flash-based artifacts from digital images.

BACKGROUND OF THE INVENTION

When photographs are taken of people using a digital or traditional film camera with a flash, a common artifact that can appear in the picture is referred to as "red-eye." This artifact manifests itself as a red coloration within the pupils of eyes, instead of the natural black or dark gray color, and is referred to as a "flash effect."

Red-eye is caused by the reflection of light from a flash off of the blood vessels of the retinas of a subject's eyes. One can try to reduce the red-eye by increasing the light level in the room by turning on all the lights. Alternatively, one can have a subject look at a bright light, such as a room lamp, just before taking the flash picture. Both methods of red-eye reduction described above cause the subject's pupils to contract, thereby reducing the amount of reflective surface.

Interestingly, this flash effect appears as red eyes in humans, but as yellow eyes in dogs and cats, and green eyes in some other animals. Photographers and image compositors commonly touch up their images and remove the flash effects from the eyes.

Adobe's PhotoDeluxe™ 2.0 and Microsoft's PictureIt!™ 2.0 are digital photo-editing software applications that offer semi-automatic red-eye removal as a feature. Such software applications require a user to select a region surrounding a group of pixels that are corrupted by red-eye. In operating PhotoDeluxe 2.0, for example, a user selects a red-eye area, clicks a button and then the eyes return to their natural color.

SUMMARY OF THE INVENTION

There is provided in accordance with a preferred embodiment of the present invention a method for removal of flash artifacts from a digital image containing pixels therein, including using a database of reference flash-corrupted images for identifying corrupted pixels within the digital image that have been corrupted by a flash, and modifying the color values of each corrupted pixel of the digital image, to correct the corrupted pixel color values.

There is also provided in accordance with a preferred embodiment of the present invention a method for detecting flash artifacts in a digital image containing pixels therein, including analyzing pixel color values for a group of pixels in the digital image, to determine a likelihood that each pixel of the group of pixels would be classified as flash-corrupted, based on a database of reference flash-corrupted images, and employing the likelihoods for identifying corrupted pixels within the digital image that have been corrupted by a flash.

There is also provided in accordance with a preferred embodiment of the present invention a method for removal of flash artifacts from a digital image containing pixels therein, including automatically identifying corrupted pixels within the digital image that have been corrupted by a flash, and modifying the color values of each corrupted pixel of the digital image, to correct the corrupted pixel color values.

There is also provided in accordance with a preferred embodiment of the present invention a system for removal of flash artifacts from a digital image containing pixels therein, including a pixel processor identifying corrupted pixels within the digital image that have been corrupted by a flash, based on a database of reference flash-corrupted images, and a color processor modifying the color values of each corrupted pixel of the digital image, to correct the corrupted pixel color values.

There is also provided in accordance with a preferred embodiment of the present invention a system for detecting flash artifacts in a digital image containing pixels therein, including a pixel analyzer analyzing pixel color values for a group of pixels in the digital image, to determine a likelihood that each pixel of the group of pixels would be classified as flash-corrupted, based on a database of reference flash-corrupted images, and a pixel processor employing the likelihoods for identifying corrupted pixels within the digital image that have been corrupted by a flash.

There is also provided in accordance with a preferred embodiment of the present invention a system for removal of flash artifacts from a digital image containing pixels therein, including a pixel processor automatically identifying corrupted pixels within the digital image that have been corrupted by a flash, and a color processor modifying the color values of each corrupted pixel of the digital image, to correct the corrupted pixel color values.

There is also provided in accordance with a preferred embodiment of the present invention a photo kiosk including a touch-sensitive screen, red-eye correction apparatus, and a photo printer unit.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

In accordance with a preferred embodiment of the present invention, removal of flash effects is effected by two essential steps. First, the pixels that have been corrupted by the flash are identified, either (i) semi-automatically using a database of reference flash-corrupted images, or (ii) fully automatically. Second, the color values of the corrupted pixels are corrected.

The term "pixel" is used herein to denote a picture element of a digital image. A pixel has both a location, referred to as the pixel location, and a color, referred to as the pixel color. The pixel color is characterized by a pixel color value, which is typically a triplet of three individual color channel values, such as red (R), green (G) and blue (B). The R, G and B values may be 8-bit integer values ranging from 0 to 255. Many other well-known color spaces may also be used, and color channels may also have precisions other than 8 bits.

Identifying the pixels that have been corrupted by the flash is complicated by the fact that non-corrupted pixels in the vicinity of those that have been corrupted may have a similar color to that of the flash artifact. For example, in the case of humans, pink skin color near an eye may have a similar color to the red-eye portion of the eye, but must be distinguished from red flash-corrupted pixels. If one were only to use the red color component in identifying the "red-eye" pixels, pixel locations where natural pink skin color is present might also be identified, and then improperly "corrected."

One possible approach is to manually select each flash-corrupted pixel, but since the user of the application must carry this out for each image processed, this is far too time consuming for practical use. Clearly a fully or near-fully automated method is preferred. The method used by the present invention in carrying out the identification of corrupted pixels is such an automated method, and is described in detail hereinbelow.

In accordance with a preferred embodiment of the present invention, correcting the color values of the corrupted pixels is carried out by converting the flash-corrupted pattern to a natural textural pattern. The eye's outer surface consists of three concentric areas: the white, the iris and the pupil. The white is the outer area, the iris is the colored middle area commonly used to determine the "color" of one's eyes, and the pupil is the black or dark gray inner area. The flash effect occurs in the pupil. The present invention corrects the flash effect by converting the color values of the corrupted pixels to an appropriate gray-scale monochrome color value.

For color values specified using the familiar triplet of red (R), green (G) and blue (B) color channels, the correction proceeds by modifying a color value of (R, G, B) to a color value of (Y, Y, Y). In a preferred embodiment of the present invention, the monochrome Y channel values are a function of the green and blue channel values alone. Some exemplary choices are Y=max(G, B), Y=min(G, B), Y=_(G+B). It should be pointed out that the G and B values are typically both very small within the pupil, even for flash-corrupted pixels, and as such, the exemplary choices indicated above tend to produce similar values of Y, corresponding to a dark gray or black color.

Figure 1:
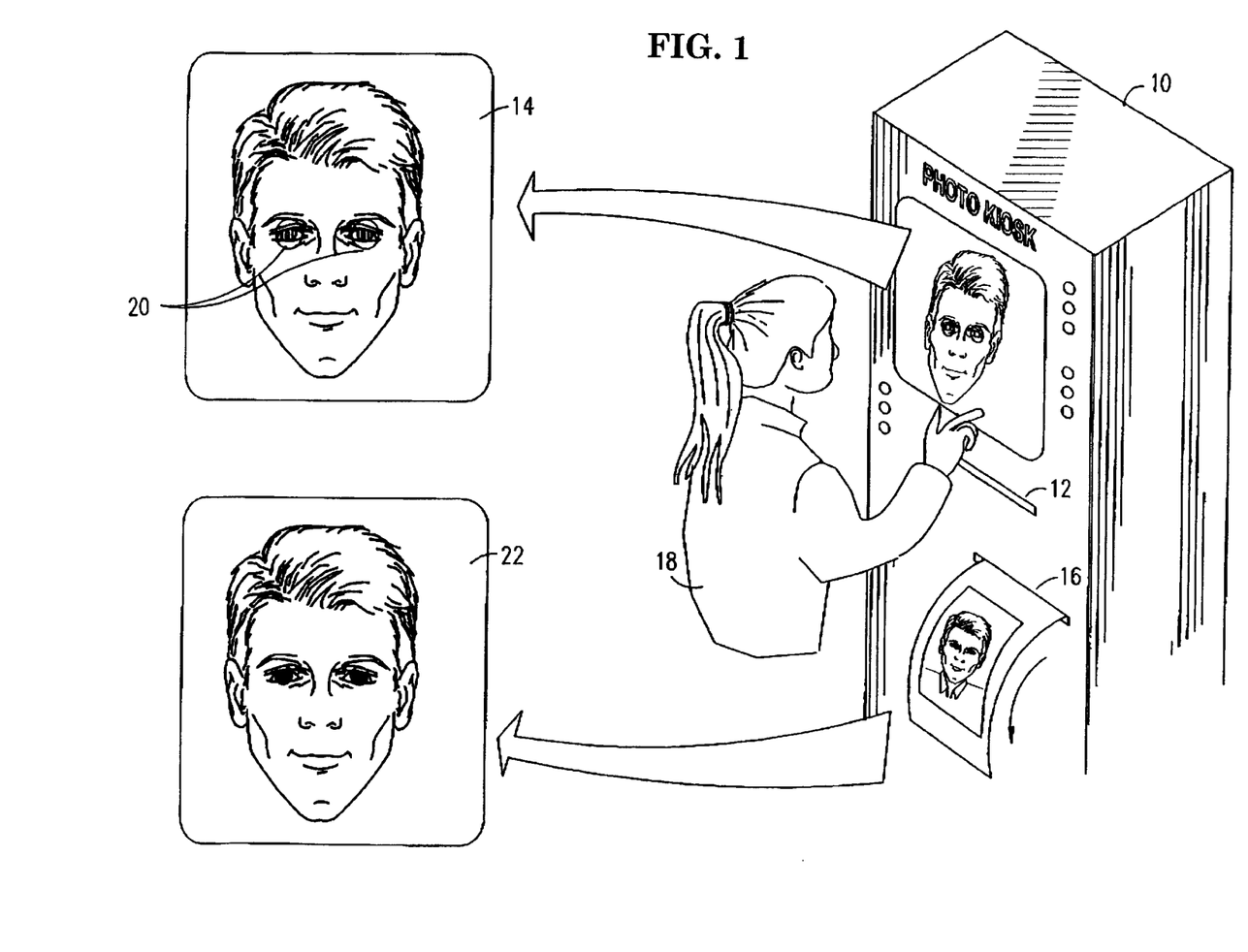
FIG. 1 is a simplified illustration of a red-eye removal feature of a photo kiosk, in accordance with a preferred embodiment of the present invention.

Reference is now made to FIG. 1, which is a simplified illustration of a red-eye removal feature of a photo kiosk 10, in accordance with a preferred embodiment of the present invention. The kiosk 10 illustrated in FIG. 1 contains a reader 12 for inputting a photo 14, and a printing device 16 for outputting a photo product 22, such as a poster, personalized stationary, business cards, an invitation or a calendar. It also provides features that enable a user 18 to edit the photo 14.

The user 18 inputs the photo 14 into the kiosk 10. If the photo is corrupted by red-eye, the user can correct this by positioning a circular cursor 20 around pixels corrupted by red-eye, and instructing the kiosk 10 to remove the red-eye. Upon such instruction, the kiosk 10 runs a software application that carries out red-eye removal in accordance with a preferred embodiment of the present invention, as described with reference to FIG. 3 below. After the red-eye is corrected, the user 18 can further edit the photo 14. Upon completion of the editing, the user can print the photo product 22 by means of the printer device 16 that forms part of the photo kiosk 10.

Pre-processing the reference images

The present invention uses a database of digital images with flash effects to identify those pixels of any subject digital image that are flash-corrupted. The database is constructed from a collection of images used as references.

For each reference image, the flash-corrupted pixels are identified either manually or automatically, or by a combination of both. Alternatively, the reference images can be set up initially so that all of the pixels contained therein are part of a flash-corrupted effect, obviating the need for manual or automatic identification. Because, in at least one embodiment, the reference images are processed by the application developer, rather than the user, a manual approach, although more time-consuming and less desirable than an automatic approach, is nevertheless possible.

For each reference image, once the flash-corrupted pixels have been identified, the pixel color values $(r_n, g_n, b_n)$ of those pixels are used as samples for statistical estimation of a probability distribution function for the flash effect. The subscript n above is used to index the flash-corrupted pixels of a reference image. In a preferred embodiment of the present invention, a model is assumed for a probability density function $f(r, g, b; p)$, where p is a vector of unknown parameters of the distribution to be estimated from the sample data $\{(r_n, g_n, b_n)\}$. In one embodiment of the present invention, the probability density function $f(r, g, b; p)$ is taken to be tri-variate Gaussian, and its vector of means and matrix of covariances are estimated from the sample data. A general reference for statistical estimation procedures is Hogg and Tanis, "Probability and Statistical Inference," ISBN: 0132546086, published by Prentice-Hall.

The following source code listing, written in the C++ programming language, carries out the calculations for the means and covariances in accordance with a preferred embodiment of the present invention. In the listing, Image24BMP is a data structure for a 24-bit color image, and the pixel color values are stored in the array itsData[ ]. Specifically, itsData[i] contains the red, green and blue color values for pixel number i, where i runs serially from 0 to the total number of pixels in the image, which is itsNCols*itsNRows. As can be seen in the listing, the red, green and blue averages are calculated by averaging the red, green and blue values of the pixels. The covariances are calculated by averaging the products of the red, green and blue values of the pixels with their respective averages subtracted off. The array XminusMU[ ] is used to store the pixel color data with the appropriate average subtracted off.

```
double Image24BMP::GetRedAverage( ) const
{
    double aRedAverage=0.0;
    for (int i=0; i<itsNCols*itsNRows; i++)
        RedAverage=aRedAverage+
            (double)itsData[i].GetRed( );
    aRedAverage=aRedAverage/(itsNCols*itsNRows);
    return(aRedAverage);
}
double Image24BMP::GetGreenAverage( ) const
{
    double aGreenAverage=0.0;
    for (int i=0; i<itsNCols*itsNRows; i++)
        aGreenAverage=aGreenAverage+
            (double)itsData[i].GetGreen( );
    aGreenAverage=aGreenAverage/(itsNCols*itsNRows);
    return(aGreenAverage);
```

```
}
double Image24BMP: :GetBlueAverageo const
{
    double aBlueAverage=0.0;
    for (int i=0; i<itsNCols*itsNRows; i++)
        aBlueAverage=aBlueAverage+
            (double)itsData[i].GetBlue( );
    aBlueAverage=aBlueAverage/(itsNCols*itsNRows);
    return(aBlueAverage);
}
MatrixSquare3 Image24BMP::
    GetSigma(const Image24BMP& theImage)
{

MatrixSquare3 SigmaMatrix;
    double *XMinusMu, BufSigma;
    double RedAverage, GreenAverage,
        BlueAverage;
    int i,j;
    XMinusMu=new double[3*itsNCols*itsNRows];
    RedAverage=thehmage.GetRedAverage( );
    GreenAverage=theImage.GetGreenAverage( );
    BlueAverage=theImage.GetBlueAverage( );
    for (i=0;
        i<(theImage.GetNCols( )*theInage.GetNRows( )); i++)
    {

XMinusMu[i]=theImage[i].GetRed( )—RedAverage;
    XMinusMu[i+itsNCols*itsNRows]=theImage[i]
        .GetGreeno—GreenAverage;
    XMinusMu[i+2*itsNCols*itsNRows]=theImage[i]
        .GetBlue( )—BlueAverage;
} for (i=0; i<3; i++)
    {
for j=0; j<3; j++)
{
    BufSigma=0; for (int k=0; k<itsNCols*itsNRows; k++)
        BufSigma=BufSigma+XMinusMuk[+
            i*itsNCols*itsNRows]*
        XMinusMu[k+j*itsNCols*itsNRows];
    SigmaMatrix[j+i*3]=BufSigma/(float)
        (itsNCols*itsNRows -1);
    }
} delete [ ] XMinusMu; return(SigmaMatrix);
}
```

For color spaces such as CMYK, with more or fewer color channels, a multi-variate Gaussian of a different dimensionality can be used instead of the tri-variate Gaussian. Similarly, non-Gaussian distributions may also be used instead.

Figure 2:
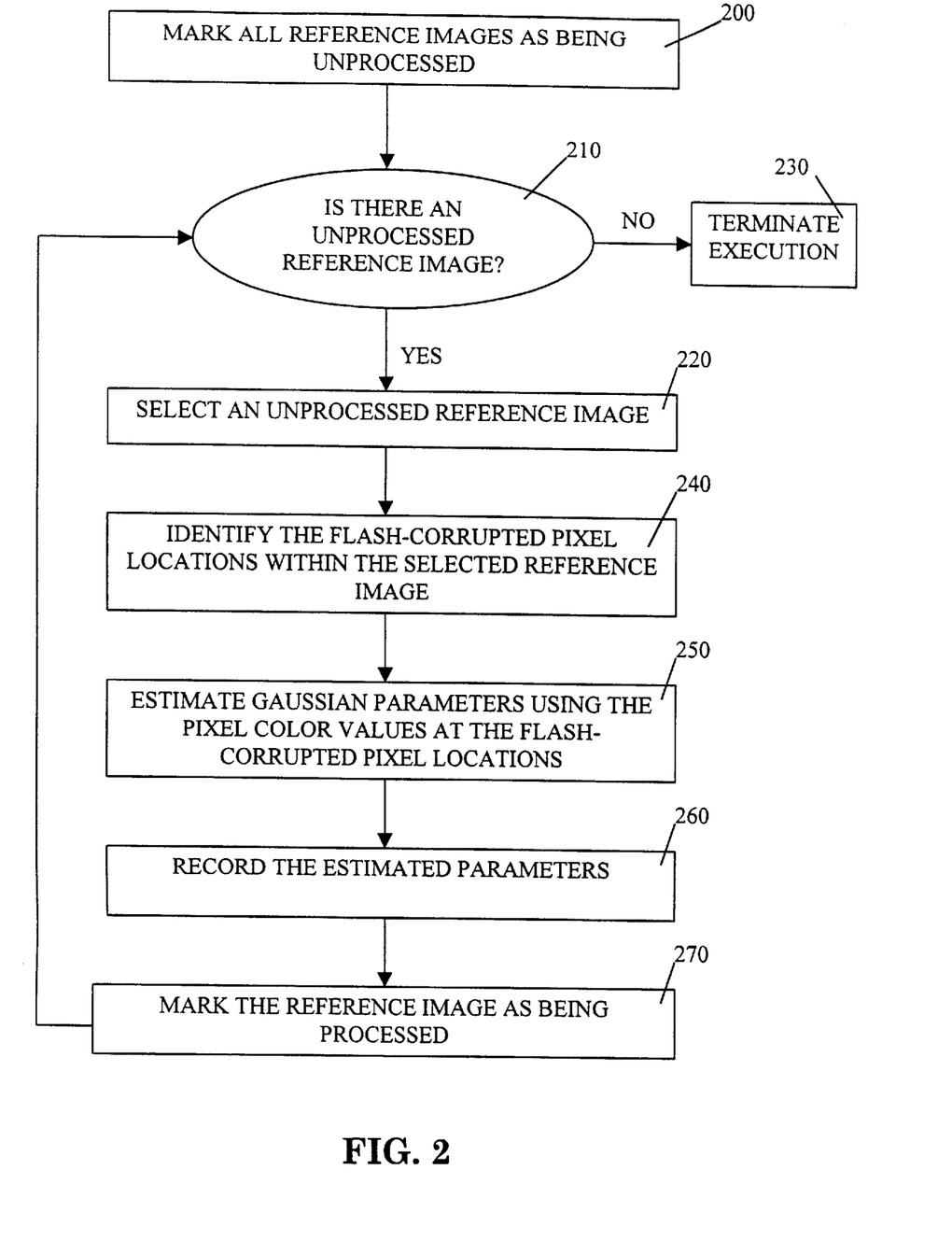
FIG. 2 is a simplified flow chart illustrating how parameters for each reference image are estimated in a preferred embodiment of the present invention.

Reference is now made to FIG. 2, which is a simplified flow chart illustrating how the above-described estimation of parameters is performed for each reference image. Initially, at step 200, all reference images are marked as unprocessed. At step 210 a check is made whether a reference image has not yet been processed. If so, at step 220 an unprocessed reference image is selected. Otherwise, at step 230 execution terminates. At step 240 the flash-corrupted pixels within the selected reference image are identified. At step 250 the color values of those pixels identified at step 240 are used to estimate the parameters of a Gaussian probability distribution. At step 260 the estimated parameters are then recorded for each such image. At step 270 the reference image is marked as processed, and control returns to step 210. By recording the estimated parameters, the estimated probability distributions corresponding to each reference image are effectively recorded. These probability distributions are henceforth referred to as the reference probability distributions. The probability density function for reference image I is denoted by $f_I$ in what follows.

Identifying the Flash-corrupted pixels based on the reference images

After the estimated parameters are recorded, an application using the present invention can be used to identify flash-corrupted pixels in arbitrary digital images. In a preferred embodiment of the present invention, when a subject digital image is given, each pixel color value is used as an argument in each reference probability distribution, to determine a likelihood value. Specifically, each pixel color value $(r_n, g_n, b_n)$ is substituted as an argument into each reference probability density function of each reference image I, to determine a likelihood $$L_n(I)=f_I(r_n, g_n, b_n; p).$$

This likelihood $L_n(I)$ represents the likelihood that color value $(r_n, g_n, b_n)$ would be classified as a flash-corrupted pixel within the reference image I. The subscript n is used to index the pixels in the subject digital image.

In a preferred embodiment of the present invention, a threshold likelihood L_ThRESHOLD is prescribed, and the pixel location with color value $(r_n, g_n, b_n)$ is classified as being flash-corrupted if its likelihood $L_n(I)$ exceeds L_ThRESHOID for any of the reference images I.

It is clear that calculation of the likelihood values for each pixel in a subject image and for each reference image, can be demanding. To make this more efficient, only a small subset of pixels within the subject image within a vicinity of the flash-corrupted pixel locations, is tested. In a preferred embodiment of the present invention, this subset is chosen by first having a user select a region surrounding a group of flash-corrupted pixels, by means of a user interface, and then pre-filtering the pixels within the user-selected region by means of the pixel color saturation levels.

User selection of a region surrounding a group of flash-corrupted pixels can be accomplished by enabling a user to position a closed curve, such as a circle or an ellipse or a square, around a group of flash-corrupted pixels. For example, a user could position a circle around the red-eye pixels in one eye. This would limit the number of likelihood calculations to those pixels within the circle.

Pre-filtering by color saturation further reduces the number of likelihood calculations by eliminating those pixels for which the color saturation level is below a prescribed saturation threshold. The rationale for this is that flash-corrupted pixels, such as red-eye, tend to have highly saturated color values. In at least one embodiment, saturation is determined as the S color component within the hue (H), saturation (S) and value (V) three-channel color system. A general reference for color spaces is Foley, van Dam, Feiner and Hughes, "Computer Graphics: Principles and Practice," ISBN: 0201848406, published by Addison Wesley.

The following source code listing, written in the C++ programming language, carries out the calculations for saturation in accordance with a preferred embodiment of the present invention.

```
double ERedEyeTool::
    RGB2Saturation(Pixel& theRGBPixel)
{
```

```
float aRed, aGreen, aBlue, aMin, aMax, delta;
double aSaturation;
aRed=(float)theRGBPixel.red/255.0;
aGreen=(float)theRGBPixel.green/255.0;
aBlue=(float)theRGBPixel.blue/255.0;
    aMax=max3(aRed,aGreen,aBlue);
    aMin=min3(aRed,aGreen,aBlue);
    if (aMax==0)
    aSaturation=0;
    else
    {
    delta=aMax—aMin;
    aSaturation=(delta/aMax) * 100.0;
    }
    return(aSaturation);
}
```

Figure 3:
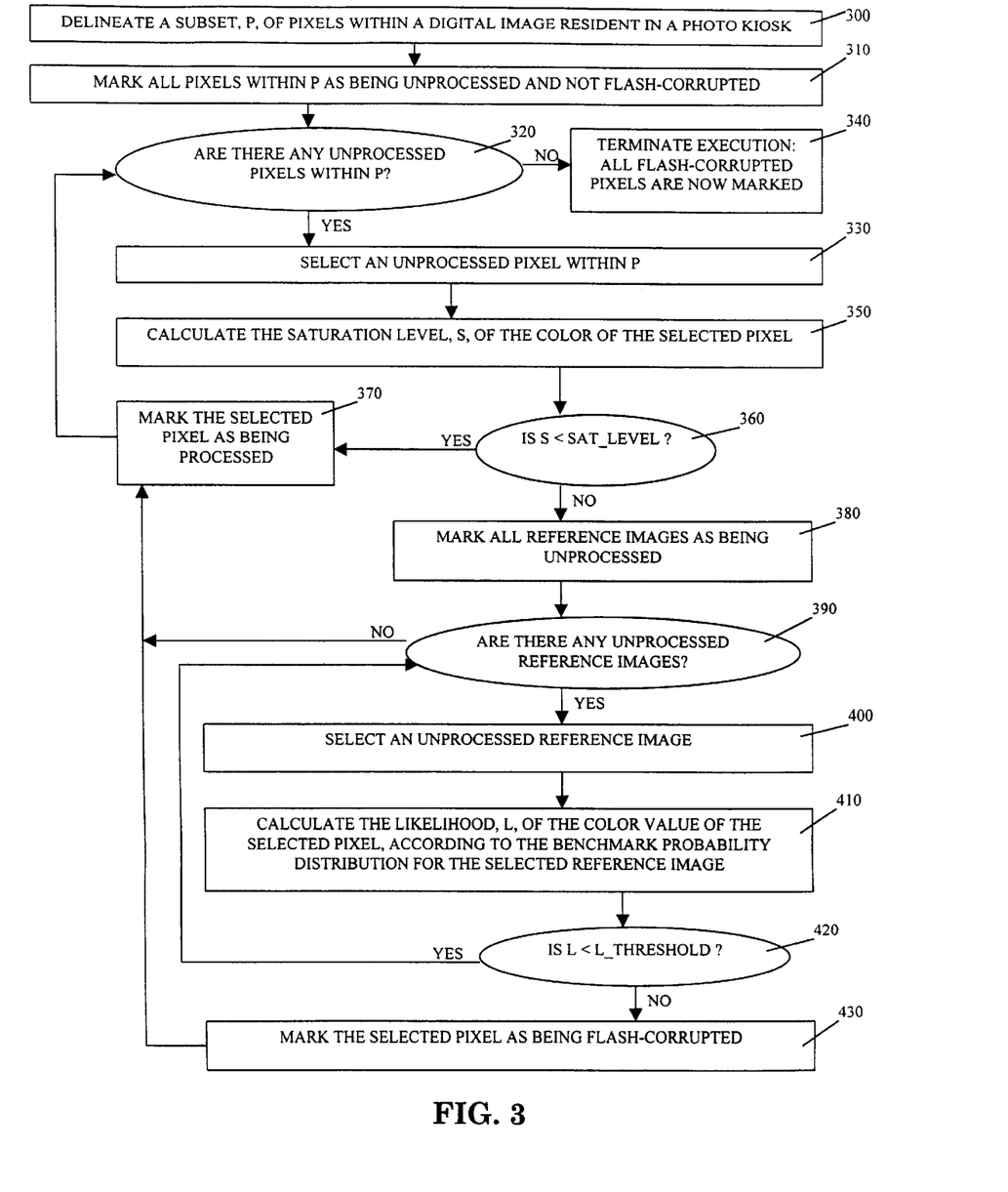
FIG. 3 is a simplified flow chart of a photo kiosk application that identifies flash-corrupted pixels in a digital image, based on a database of reference images, in accordance with a preferred embodiment of the present invention.

Reference is now made to FIG. 3, which is a simplified flow chart for a photo kiosk application that identifies flash-corrupted pixels in a subject digital image, by means of a database of reference images, in accordance with a preferred embodiment of the present invention. At step 300, a user delineates a subset P of pixels within the subject digital image by means of a user interface, such as the one described below in reference to FIG. 4. At step 310 all pixels within the subset P are marked as unprocessed and not flash-corrupted.

At step 320 a check is made whether there are any unprocessed pixels within the subset P. If so, at step 330 an unprocessed pixel is selected and its color value $(r_n, g_n, b_n)$ is read. If not, execution terminates at step 340. At step 350 the saturation level $s_n$ of the pixel color is calculated. At step 360 a check is made whether the saturation level $s_n$ is below a prescribed threshold SAT_LEVEL. If so, at step 370 the pixel is marked a s processed, and control returns to step 320. Otherwise, a t step 380 the reference images are all marked as unprocessed.

At step 390, a check is made whether there are any unprocessed reference images. If so, at step 400 an unprocessed reference image I is selected. At step 410 the likelihood $L_n(I)=f_I(r_n, g_n, b_n; p)$ is calculated using the estimated parameters p for the reference probability density corresponding to the reference image I. At step 420 a check is made whether the likelihood $L_n(I)$ is below a prescribed threshold confidence level L_THRESHOLD. If so, control returns to step 400. Otherwise, at step 430 the pixel is marked as being flash-corrupted and control returns to step 370. Step 430 points out that it is not necessary to exhaustively test all of the reference images. As soon as one reference image gives rise to a likelihood above L_ThRESHOLD, the decision is conclusive, and the pixel is marked as flash-corrupted. In an alternate embodiment, a threshold number of likelihoods above L_THRESHOLD may be required before a pixel is marked as flash corrupted.

When execution terminates the flash-corrupted pixels are then identifiable as those pixels that have been marked as flash-corrupted.

The following source code listing, written i n the C++ programming language, carries out the calculations for deciding whether or not a pixel is flash-corrupted in accordance with a preferred embodiment of the present invention. The array aCircleBrush[ ] is used to denote those pixels that are within a circular cursor, as described below with reference to FIG. 4. The method ComputeMaximumLikelihood calculates the multi-variate Gaussian probability density function. The double for loop calculates the quadratic form aUnderExp that forms the exponent in the exponential term, and the parameters aPdf is the normalizing constant that pre-multiplies the exponential term. The parameters NB_COLOR_CHANNELS denotes the number of color channels, which is typically three. The method IsPixelToBeCorrected checks whether the maximum likelihood exceeds the threshold confidence level L_THRESHOLD. It returns the value 255 if the pixel is corrupted and needs to be corrected, and it returns the value 0 otherwise. The methods GetlnverseSigma and GetDeterminant calculate the inverse matrix and the determinant of the covariance matrix, respectively.

```
    if ((RGB2Saturation(aPixelTable[i]))>SAT_LEVEL)
    {
       anOpacityValue=IsPixelToBeCorrected(aPixelTable
         [i]);
       if ((anOpacityValue==255) &&
         (aCircleBrush[i]==255))
         //correct the corrupt pixel
    }
unsigned char ERedEyeTool::
    IsPixelToBeCorrected(const Pixel& thePixel)
{
double *aProbaBuf;
aProbaBuf=NEW double [itsNbOfStat];
double aMaxProba=0.0;
for (int j=0;j<itsNbOfStat;j++)
    aProbaBuf[j]=ComputeMaximumLikelihood(thePixel,
      itsRedEyeList[j]);
    aMaxProba=MAXI(aMaxProba,aProbaBuf[j]);
}
if (aMaxProba>L_THRESHOLD)
{
    delete[ ] aProbaBuf; return((unsigned char)255);
}
else
{
    delete[ ] aProbaBuf;
    return((unsigned char)0);
}
double ERedEyeTool::
    ComputeMaximumLikelihood(const Pixel& thepixel,
       ERedEyeStat theRedEyeStat)
{
double aPdf, aUnderExp(0.0);
double aBufX[NB_COLOR_CHANNELS+1],
anInverseSigmaData;
aPdf=
    sqrt(pow(2*PI,NBCOLORCHANNELS) *
       theRedEyeStat.GetDeterminant( ));
aPdf=(double) 1.0/aPdf;
aBufX[1]=thePixel.rouge—theRedEyeStat.GetRedMean( );
aBufX[2]=thepixel.vert—theRedEyeStat.GetGreenMean( );
aBufX[3]=thepixel.bleu—theRedEyeStat.GetBlueMean( );
for (int i=1; i<=NB_COLOR_CHANNELS; i++)
{
for (intj=1; j<=NB_COLOR_CHANNELS; j++)
{
    anInverseSigmaData=theRedEyeStat.GetInverseSigma(
       (i-1)*NB_COLOR_CHANNELS+j);
    aUnderExp=aUnderExp+anInverseSigmaData*aBufX[i]
       *aBufX[j];
}
}
```

```
aUnderExp=(double)aUnderExp/2.0;
aPdf=aPdf*exp(-aUnderExp);
return(aPdf);
}
```

Figure 4:
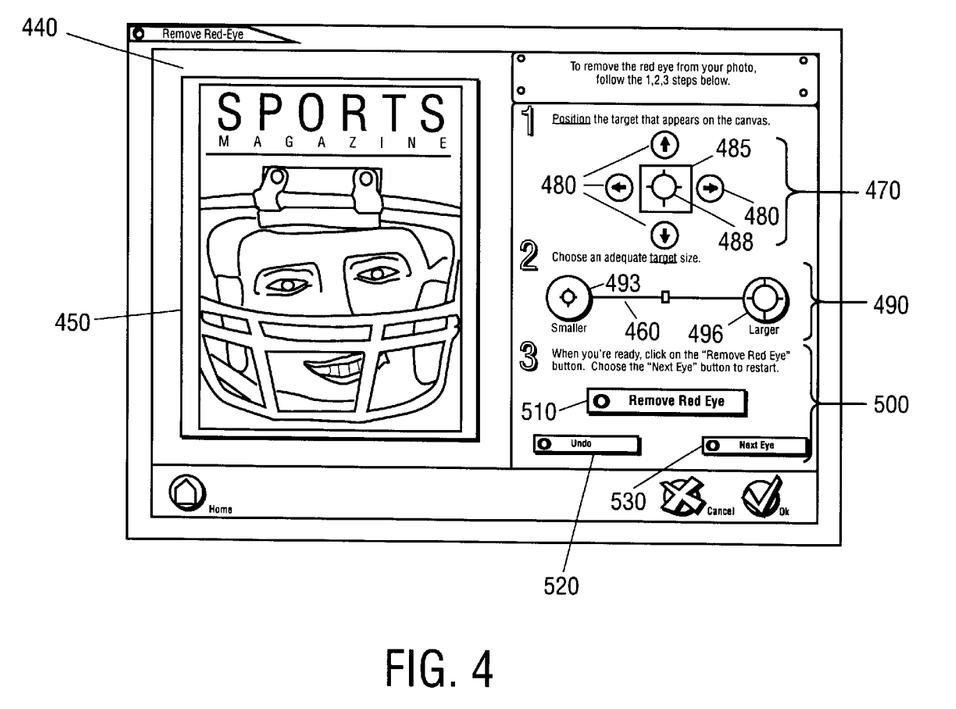
FIG. 4 is an illustration of a touch-sensitive screen presented to a user of a preferred embodiment of the present invention.

Reference is now made to FIG. 4, which illustrates a touch-sensitive screen 440 presented to a user in a preferred embodiment of the present invention. The screen illustrated is part of a photo kiosk system, such as the system of FIG. 1. Such a system allows only limited user interaction. A user arrives at this screen by having instructed the kiosk to launch a "REMOVE RED EYE" screen from a previous menu. When this screen is initially launched, a target circular cursor (not shown) is positioned in the center of an image 450 appearing on the screen. The cursor is preferably bi-colored so as to avoid hidden contrast with the photo. A slider bar 460 is initially at the center, corresponding to a medium-sized circular cursor.

A region 470, corresponding to the step labeled "1", enables a user to position the circular cursor within image 450, and move it around by pressing on the four directional arrows 480. An image portion 485 within the four arrows is a magnified preview of the portion of image 450 in the vicinity of the circular cursor. The circular cursor can also be moved around by moving circle 488 within image portion 485 using the tip of a finger.

A region 490, corresponding to the step labeled "2", enables a user to reduce or enlarge the size of the circular cursor by pressing on "SMALLER" and "LARGER" buttons, 493 and 496, respectively, at the ends of slider bar 460, respectively. Pressing on buttons 493 and 496 serves to decrease or increase the radius of the circle, respectively, keeping its center fixed. When the size of the circular cursor is adjusted, the portion and magnification factor of image portion 485 in the preview box above changes correspondingly. Specifically, as the size of the circular cursor decreases, the magnification factor of previewed image portion 485 increases. The objective of steps 1 and 2 is to position the circular cursor around the red-eye portion of a first eye, so as to completely encircle the red-eye pixel locations.

A region 500, corresponding to the step labeled "3", provides the operational step, in which a user presses on a "REMOVE RED EYE" button 510 to instruct the application to run through the algorithm described above in reference to FIG. 3. Once "REMOVE RED EYE" button 510 is pressed, image 450 will be modified to correct for the red eye in the selected eye within the circular cursor. In addition, preview image portion 485 is also modified in accordance with the red-eye removal.

The user interface in FIG. 4 also provides a button 520 labeled "UNDO" to remove the red-eye correction and return image 450 to its original form, in case the user is not satisfied and wants to re-position the circle. "UNDO" button 520 undoes all of the remove actions performed within the current remove edit session.

Once the user is satisfied and accepts the red-eye correction, another button 530 labeled "NEXT EYE" is used to process the second eye. When "NEXT EYE" button 530 is pressed, the circular cursor goes back to the center of image 450 and is restored to its original size. In an alternate embodiment, the circular cursor may be moved to a different location on the image or keep its current size when the "NEXT EYE" button 530 is pressed. When both eyes have been processed, image 450 has been corrected, and the flash effects have been removed.

Figure 5:
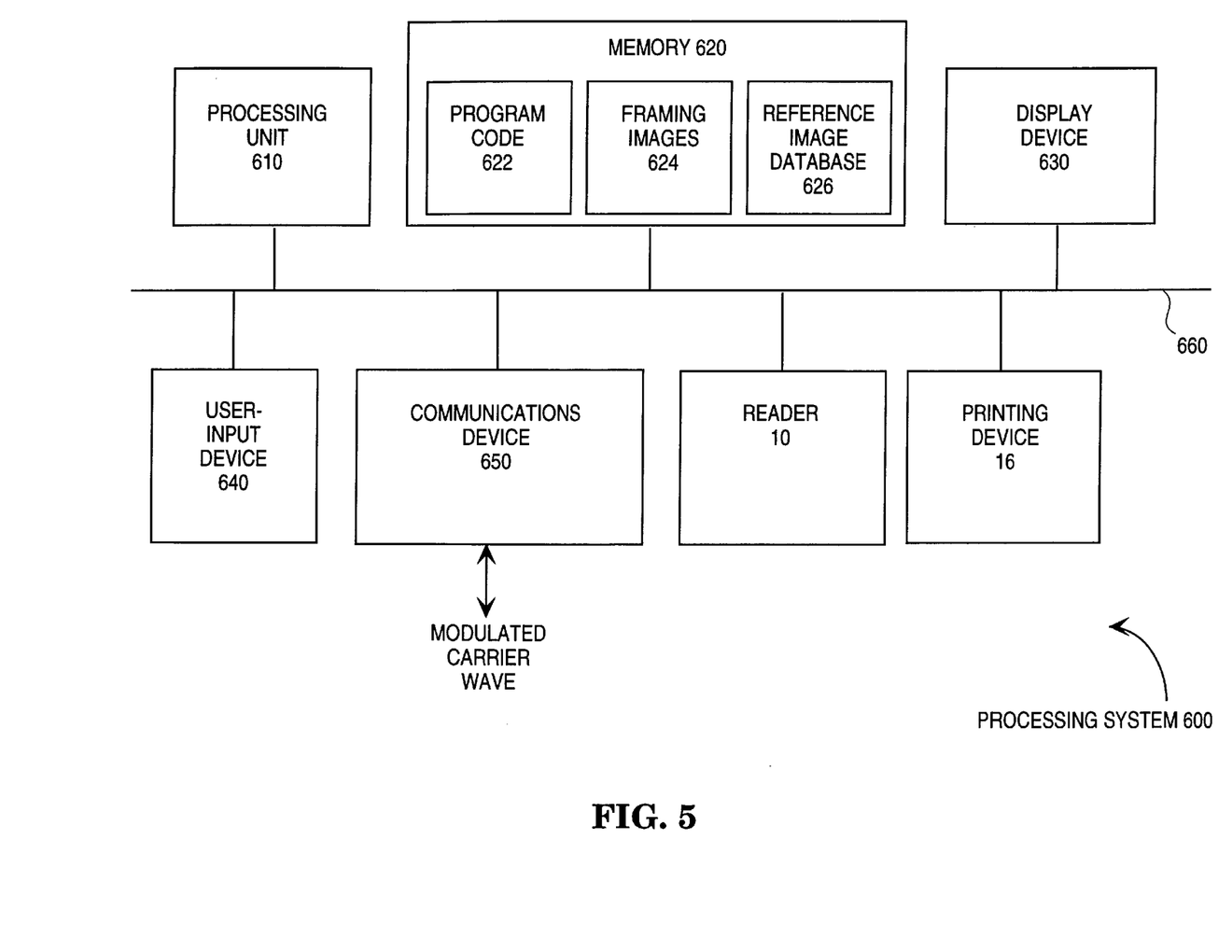
FIG. 5 is a block diagram of a processing system that can be used to perform processing operations used in embodiments of the present invention.

FIG. 5 is a block diagram of a processing system 600 that can be used to perform processing operations used in embodiments of the present invention. The processing system 600 includes a processing unit 610, memory 620, display device 630, user-input device 640, communications device 650, reader 10 and printing device 16 each coupled to a bus structure 660. In the case of the photo kiosk 10 of FIG. 1, the display device 630 and the user-input device 640 may be implemented by a touch-sensitive screen described above in reference to FIG. 4. In alternate embodiments, the user-input device 640 may be a mouse, trackball, stylus, or any other device for manipulating elements displayed on display device 630. Moreover, user-input device 640 may include a keypad or keyboard to allow a user to input alphanumeric data into the processing system 600.

The processing unit 610 may include one or more general purpose processors, one or more digital signal processors or any other devices capable of executing a sequence of instructions. When programmed with appropriate instructions, the processing unit may be used to implement a number of different types of machines including, but not limited to, a pixel processor, pixel analyzer, color processor, statistical processor, computational unit and so forth.

The communications device 650 may be a modem, area network card or any other device for coupling the processing system 600 to a computer network. The communications device may be used to generate or receive a carrier wave modulated with a data signal, for example, for obtaining images or text from a server computer on the World Wide Web or other network, or for receiving updated program code or function-extending program code that can be executed by the processing unit to implement embodiments of the present invention.

The memory 620 may include both system memory and non-volatile storage devices such as magnetic tape, magnetic disk, optical disk, electrically erasable programmable read only memory (EEPROM), or any other computer-readable medium. As shown in FIG. 5, the memory 620 may be used to store program code 622 for performing the above-described processing operations, framing images and other documents 624 that can be combined with user-supplied images, and the above-described database of reference flash-corrupted images 626. In one embodiment, when power is applied to the processing system 600, operating system program code is loaded from non-volatile storage into system memory by the processing unit 610 or another device, such as a direct memory access controller (not shown). Sequences of instructions comprised by the operating system are then executed by processing unit 610 to load other sequences of instructions, including the above-described application programs, from non-volatile storage into system memory. Thus, embodiments of the present invention may be implemented by obtaining sequences of instructions from a computer-readable medium, including the above-described carrier wave, and executing the sequences of instructions in the processing unit 610.

Having described a processing system for implementing embodiments of the present invention, it should be noted that the individual processing operations described above may also be performed by specific hardware components that contain hard-wired logic to carry out the recited operations or by any combination of programmed processing components and hard-wired logic. Nothing disclosed herein should be construed as limiting the present invention to a single embodiment wherein the recited operations are performed by a specific combination of hardware components.

It will be appreciated by persons skilled in the art that the present invention is not limited by what has been particularly shown and described hereinabove. Rather the present

What is claimed is:

1. A method for removal of flash artifacts from a digital image containing pixels therein, comprising:
   using a database of reference flash-corrupted images for identifying corrupted pixels within the digital image that have been corrupted by a flash, said using comprising:
      estimating, for each reference flash-corrupted image, parameters of a corresponding reference probability distribution function that characterizes the pixels of the reference flash-corrupted image that are cprrupted by a flash; and
      evaluating, for each pixel within a group of pixels from the image, the reference probability distribution functions for the color value of the poxel, using estimated parameters; and wherein said method futher comprises:
         modifying the color, values of each corrupted pixel of the digital image, to correct the corrupted color values.

2. The method of claim 1, wherein said using a database further comprises selecting those pixels having color values for which at least one of the refernce probability distribution function exceeds a prescribed threshold confidence level.

3. The method of claim 1 wherein the reference probability distribution functions are multi-variate Gaussian distribution functions.

4. The method of claim 3 wherein the estimated parameters are the means and covariances of the multi-variate Gaussian distribution.

5. The method of claim 1 wherein said estimating uses statistical estmation based on sample color value data from the flash-corrupted reference image.

6. The method of claim 1 wherein the group of pixels at which the reference probability distribution functions are evaluated comprises pixels within a region of pixels selected by a user.

7. The method of claim 6 wherein the group of pixels at which the reference probability distribution functions are evaluated comprises pixels within the region of pixels selected by a user having a color with saturation less than a prescribed saturation threshold.

8. The method of claim 1 wherein the group of pixels at which the reference probability distribution functions are evaluated comprises pixels having a color with saturation less than a prescribed saturation threshold.

9. The method of claim 1 wherein pixel color values are expressed as triplets of red, green and blue color channel values, and wherein said modifying comprises adjusting eash triplet of red, green and blue values to a common gray-scale color value.

10. The method of claim 9 wherein the common gray-scale value is determined by the green and blue color values.

11. The method of claim 10 wherein the common gray-scale value is the larger of the green and blue color values.

12. The method of claim 10 wherein the common gray-scale value is the smaller of the green and blue color values.

13. The method of claim 10 wherein the common gray-scale value is the average of the green and blue color values.

14. A method for detecting flash arifacts in a digital image containing pixels therin, comprising:
   analyzing pixel color values for a group of pixels in the digital image, to determine a likelihood that each pixel of the group of pixels could be classified as flash-corrupted, based on a database of reference flash-corrupted images, said analyzing comprising:
      estimating, for each reference flash-corrupted image, parameters of a corresponding reference probability distribution function that characterizes the pixels of the reference flash-corrupted image that are corrupted by a flash; and
      evaluating, for each pixel within the group of pixels in the digital image, the reference probability distribution functions for the color value of the pixel, using the estimated parameters, to determine a likelihood that the pixel would be classified as flash-corrupted based on the reference flash-corrupted images; and
      wherein said method further comprises
         employing the likelihoods for identifying corrupted pixels within the digital image that have been corrupted by a flash.

15. The method of claim 14 wherein said employing said likelihoods further comprises selecting those pixels having color values for which at least one of the reference probability distribution functions exceeds a prescribed threshold confidence level.

16. The method of claim 14 wherein the reference probability distribution functions are multi-variate Gaussian distribution functions.

17. The method of claim 16 wherein the estimated parameters are the means and covariances of the multi-variate Gaussian distribution.

18. The method of claim 14 wherein said estimating uses statistical estimation based on sample color values data from flash-corrupted reference image.

19. The method of claim 14 wherein the group of pixels at which the reference probability distribution functions are evaluated comprises pixels within a region of pixels selected by a user.

20. The method of claim 19 wherein the group of pixels at which the reference probability distribution functions are evaluated comprises pixels within the region of pixels selected by a user having a color with saturation less than a prescribed saturation threshold.

21. The method of claim 14 wherein the group of pixels at which the reference probability distribution functions are evaluated composes pixels having a color with saturation less than a prescribed saturation therehold.

22. A system for removal of flash artifacts from a digital image containing pixels therein, comprising:
   a pixel processor identifying corrupted pixels within digital image that have been corrupted by a flash, based on a database of reference flash-corrupted images, said pixel processor comprising:
      a statistical processor estimating, for each reference flash-corrupted image, parameters of a corresponding reference probability distribution function that characterizes the pixels of the reference flash-corrupted image that corrupted by a flash; and
      a computational unit evaluating, for each pixel within a group of pixels from the digital image, the reference probability distribution functions at the color value of the pixel, using the estimated parameters; and
   a color processor modifying the color values of each corrupted pixel ofthe digital image, to correct the corrupted pixel color values, said color processor coupled to said pixel processor.

23. The system of claim 22 wherein said pixel processor further comprises a pixel selector selecting those pixels for which at least one of the reference probability distribution functions exceeds a prescribed threshold confidence level.

24. The system of claim 22 wherein the reference probability distribution functions are multi-variate Gaussian distribution functions.

25. The system of claim 24 wherein the estimated parameters are the means and covariances of the multi-variate Gaussian distribution.

26. The system of claim 22 wherein said statistical processor uses statistical estimation based on sample color value data from the flash-corrupted reference image.

27. The system of claim 22 wherein the group of pixels at which the reference probability distribution functions are evaluated comprise pixels within a region of pixels selected by a user.

28. The system of claim 27 wherein the group of pixels at which the reference probability distribution functions are evaluated comprise pixels within the region of pixels selected by a user having a color with saturation less than a prescribed saturation threshold.

29. The system of claim 22 wherein the group of pixels at which the reference probability distribution functions are evaluated comprise pixels having a color with saturation less than a prescribed saturation threshold.

30. The system of claim 22 wherein the pixel color values are expressed as triplets of red, green and blue color channel values, and wherein said pixel processor adjusts each triplet of red, green and blue values to a common gray-scale color value.

31. The system of claim 30 wherein the common gray-scale value is determined by the green and blue color values.

32. The system of claim 31 wherein the common gray-scale value is the larger of the green and blue color values.

33. The system of claim 31 wherein the common gray-scale value is the smaller of the green and blue color values.

34. The system of claim 31 wherein the common gray-scale value is the average of the green and blue color values.

35. A system for detecting flash artifacts in a digital image containing pixels therein, comprising:
a pixel analyzing pixel color values for a group of pixels in the digital image, to determine a likelihood that each pixel of the group of pixels would be classified as flash-corrupted, based on a database of reference flash-corrupted images, said pixel analyzer comprising:
a statistical processor estimating, for each reference flash-corrupted image, parameters of a corresponding reference probability distribution function that characterizes the pixels of the reference flash-corrupted image that are corrupted by a flash; and
a computational unit evaluating, for each pixel within the group of pixels in the digital image, the refernce probability distribution functions for the color value of the pixel, using the estimated parameters, to determine a likelihood that the pixel would be classified as flash-corrupted based on the reference flash-corrupted images; and
a pixel processor employing the likelihoods for identifying corrupted pixels within the digital image that have been corrupted by a flash, said pixel processor coupled to said pixel analyzer.

36. The system of claim 35 wherein said pixel processor further comprises a pixel selector selecting those pixels having color values for which at least one of the reference probability distribution functions exceeds a prescribed threshold confidence level.

37. The system of claim 35 wherein the reference probability distribution functions are multi-variate Gaussian distribution functions.

38. The system of claim 37 wherein the estimated parameters are the means and covariances of the multi-variate Gaussian distribution.

39. The system of claim 35 wherein said statistical processor uses statistical estimation based on sample color value data from the flash-corrupted reference image.

40. The system of claim 35 wherein the group of pixels at which the reference probability distribution functions are evaluated comprises pixels within region of pixel selected by a user.

41. The system of claim 40 wherein the group of pixels at which the reference probability distribution functions are evaluated comprises pixels within the region of pixels selected by a user having a color with saturation less than a prescribed saturation threshold.

42. The system of claim 35 wherein the group of pixels at which the reference probability distribution functions are evaluated comprises pixels having color with saturation less than a prescribed saturation threshold.

43. A photo kiosk comprising:
a touch-sensitive screen;
red-eye correction apparatus, comprising:
a pixel processor identifying corrupted pixels within the digital image that have been corrupted by a flash, based on a database of reference flash-corrupted images, said pixel processor comprising:
a statistical estimating, for each reference flash-corrupted image, parameters of a corresponding reference probability distribution function that characterizes the pixels of the reference flash-corrupted image that are corrupted by a flash; and
a computational unit evaluating, for each pixel within group of pixels from the digital image, the refernce probability distribution functions at the color value of the pixel, using the estimated parameter; and
a color processor modifying the color values of each corrupted pixel of the digital image, to correct the corrupted pixel color values; and
a photo printer unit.

44. A photo kiosk comprising:
a touch-sensitive screen;
red-eye correction apparatus, comprising:
a pixel analyzer analyzing pixel color values for a group of pixels in the digital image, to determine a likelihood that each pixel of the group of pixels would be classified as flash-corrupted, based on a database of reference flash-corrupted images, said pixel analyzer comprising:
a statistical processor estimating, for each reference flash-corrupted image, parameters of a corrsponding reference probability distribution function that characterizes the pixels of the referecne flash-corruted image that are corrupted by a flash; and
a computational unit evaluating, for each pixel within the group of pixels in the digital image, the reference probability distribution functions for the color value of the pixel, using the estimated parameters, to determine a likelihood that the pixel would be classified as flash-corrupted based on the reference flash-corrupted images; and
a pixel processor employing the likelihoods for identifying corrupted pixels within the digital image that have been corrupted by a flash; and
a photo printer unit.

45. An article of manufacture inluding one or more computer-readable media that embody a program of instructions for removal of flash arifacts from a digital image containing pixels therin, whrein the program of instruction, when exected by a processing system, causes the processing system to:

use a database of reference flash-corrupted imaged for identifying corrupted pixels within the digital image that have been corrupted by a flash;

estimate, for each refernce flash-corrupted image, parameters of a corresponding reference probability destibution function that characterizes the pixel of the reference flash-corrupted corrupted image that are corrupted by a flash;

evaluate, for each within group of pixels from the digital image, the reference probability distribution functions for the clor value of the pixel, using the estimated parameters; and modify the color values of each corrupted pixel of the digital image, to correct the corrupted pixel color values.

46. The article of claim 45 wherein the one or more computer-readable media include one or more non-volatile storage devices.

47. The article of claim 45 wherein the one or more computer-readable media include a carrier wave modulated with a data signal.

48. An article of manufacture including one or more computer-readable media that embody a program of instructions fo detecting flash arifacts in a digial image containing pixels therein, wherein the program of instruction, whern executed by a processing system, causes the processing system to:

analyze pixel color values for a group of pixels in the digital image, to determine a likelihood that each pixel of the group of pixels would be classified as flash-corrupted, based on a database of reference flash-corrupted images;

estimata, for each refernce flash-corrupted image, parameters of a corresponding reference probability distribution, function that characterizes the pixels of the reference flash-corrupted image that are corrupted by a flash;

evaluate, for each pixel within the group of pixels in the digital image, the refernce probability destibution functions for the color value of the pixel, using the estimated parameters, to determine a likelihood that the pixel would be classified as flash-corrupted based on the reference flash-corrupted images; and employ the likelihood for identifying corrupted pixels within the digital image that hve been corrupted by a flash.

* * * * *

UNITED STATES PATENT AND TRADEMARK OFFICE
CERTIFICATE OF CORRECTION

PATENT NO.    : 6,285,410 B1
DATED         : September 4, 2001
INVENTOR(S)   : Sandrine Marni It is certified that error appears in the above-identified patent and that said Letters Patent is hereby corrected as shown below:

Column 5,
Line 2, please delete "GetBlueAverageo const" and insert -- GetBlueAverage( ) const --
Line 20, please delete "int i,j;" and insert -- int i ,j; --
Line 22, please delete "RedAverage+thehmage.GetRedAverage( );" and insert
-- RedAverage = theImage.GetRedAverage(); --
Line 27, please delete "i<(theImage.GetNCols( )*theInage.GetNRows( ));I++)" and
insert -- i<(theImage.GetNCols()*theImage.GeNRows());i++) --
Line 29, please delete "XMinusMu[i]=theImage[i].GetRed( )--RedAverage;" and insert
-- XMinusMu[i] = theImage[i].GetRed( ) - RedAverage; --
Line 31, please delete ".GetGreeno--GreenAverage;" and insert
-- theImage[i].GetGreen() - GreenAverage; --
Line 33, please delete ".GetBlue ( )--BlueAverage;" and insert -- .GetBlue () -
BlueAverage; --
Line 41, please delete "BufSigma=BufSigma+XMinusMuk[ +" and insert -- BufSigma
= BufSigma + XMinusMu[k+ --
Line 48, please delete "return(SigmaMatrix);" and in the next line insert
-- return(SigmaMatrix); --

Column 6,
Line 28, please delete "L__ThRESHOLD" and insert -- L_THRESHOLD --
Line 31, please delete "L__ThRESHOID" and insert -- L_THRESHOLD --

Column 7,
Line 13, please delete "delta=aMax--aMin;" and insert -- delta = aMax - aMin; --
Line 34, please delete "marked a s processed," and insert -- marked as processed, --
Line 35, please delete "Otherwise a t step" and insert -- Otherwise at step --
Line 50, please delete "L__ThRESHOLD" and insert -- L_THRESHOLD --
Line 57, please delete "written i n the" and insert -- written in the --

Column 8,
Line 47, please delete "s q r t ( p o w ( 2* PI, NBCOLORCHANNELS)" and insert
-- sqrt(pow(2*PI,NB_COLOR_CHANNELS) --
Line 50, please delete "aBufX[1]=thePixel.rouge--theRedEyeStat.GetRedMean( );" and
insert -- aBufX[1] = thePixel.rouge - theRedEyeStat.GetRedMean(); --
Line 51, please delete "aBufX[2]=thepixel.ver--theRedEyeStat.GetGreenMean( );" and
insert -- aBufX[2] = thePixel.rouge - theRedEyeStat.GetGreenMean(); --
Line 52, please delete "aBufX[3]=thepixel.bleu--theRedEyeStat.GetBlueMean( );" and
insert -- aBufX[3] = thePixel.bleu - theRedEyeStat.GetBlueMean(); --
Line 57, please delete "anInverseSigmaData=theRedEyeStat.Get1nverseSigma(" and
insert -- anInverseSigmaData=theRedEyeStat.GetInverseSigma( --

UNITED STATES PATENT AND TRADEMARK OFFICE
CERTIFICATE OF CORRECTION

PATENT NO. : 6,285,410 B1
DATED : September 4, 2001
INVENTOR(S) : Sandrine Marni It is certified that error appears in the above-identified patent and that said Letters Patent is hereby corrected as shown below:

Column 11,
Line 17, please delete "cprrupted" and insert -- corrupted --
Line 19, please delete "probaility" and insert -- probability --
Line 20, please delete "poxel, using estimated" and insert -- pixel, using the estimated --
Line 23, please delete "color, values" and insert -- color values --
Line 24, please delete "corrupted color" and insert -- corrupted pixel color --
Line 28, please delete "refernce" and insert -- reference --
Line 29, please delete "function" and insert -- functions --
Line 37, please delete "estmation" and insert -- estimation --
Line 55, please delete "eash" and insert -- each --
Line 66, please delete "therin" and insert -- therein --

Column 12,
Line 45, please delete "composes" and insert -- comprises --
Line 46, please delete "therehold" and insert -- threshold --
Line 50, please insert -- the -- before "digital"
Line 57, please insert -- are -- before "corrupted"
Line 64, please delete "ofthe" and insert -- of the --

Column 13,
Line 40, please delete "a pixel analyzing" and insert -- a pixel analyzer analyzing --
Line 51, please delete "refernce" and insert -- reference --

Column 14,
Line 9, please delete "within region of pixel" and insert -- within a region of pixels --
Line 35, please delete "refernce" and insert -- reference --
Line 54, please delete "referecne" and insert -- reference --
Line 55, please delete "corruted" and insert -- corrupted --

Column 15,
Line 1, please delete "arifacts" and insert -- artifacts --
Line 2, please delete "therin" and insert -- therein --
Line 5, please delete "imaged" and insert -- images --
Lines 9 and 10, please delete "destibu-tion" and insert -- distribution --
Line 11, please delete the second instance of "corrupted"
Line 13, please insert -- pixel -- between "each" and "within"
Line 13, please insert -- a -- between "within" and "group"
Line 15, please delete "clor" and insert -- color --

UNITED STATES PATENT AND TRADEMARK OFFICE
CERTIFICATE OF CORRECTION

PATENT NO.   : 6,285,410 B1
DATED        : September 4, 2001
INVENTOR(S)  : Sandrine Marni It is certified that error appears in the above-identified patent and that said Letters Patent is hereby corrected as shown below:

<u>Column 16,</u>
Line 1, please delete "fo detecting flash arifacts in a digial" and insert -- for detecting flash artifacts in a digital --
Line 10, please delete "estimata, for each refernce" and insert -- estimate, for each reference --
Line 16, please delete "refernce probability destibution" and insert -- reference probability distribution --
Line 22, please delete "hve" and insert -- have --

Signed and Sealed this

Eleventh Day of March, 2003

JAMES E. ROGAN
*Director of the United States Patent and Trademark Office*